United States Patent Office 3,654,360
Patented Apr. 4, 1972

3,654,360
N-BENZOYL-2-AMINOMETHYLCYCLO-HEXANOL
Gabor Bernath and Kalman Kovacs, Szeged, and Eva Palosi, Peter Gorog and Laszlo Szporny, Budapest, Hungary, assignors to Richter Gedeon Vegyezeti Gyar Rt.
No Drawing. Filed Sept. 10, 1968, Ser. No. 758,682
Claims priority, application Hungary, Sept. 11, 1967, RI-328
Int. Cl. C07c 103/38
U.S. Cl. 260—558 R
3 Claims

ABSTRACT OF THE DISCLOSURE

The invention concerns N-cycloalkylmethyl carboxylic amides which may be used in the treatment of epilepsy in view of their marked sedative action on the CNS.

---

This invention relates to the preparation of new, therapeutically valuable N-cycloalkylmethyl acid amides.

It has been found that new N-cycloalkylmethyl acid amides of the general Formula I

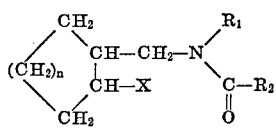

wherein:
$R_1$ represents hydrogen or an alkyl, cycloalkyl phenyl, substituted phenyl, benzyl or substituted benzyl group;
$R_2$ represents an alkyl, cycloalkyl, phenyl or substituted phenyl group;
X represents hydrogen, chlorine, bromine, iodine or fluorine, a hydroxyl group or a group —OR (wherein R represents any of the values stated for $R_1$, except hydrogen); and $n=1$ or 2 have a very marked sedative action on the central nervous system and can therefore be used patricularly advantageously in therapeutics for the treatment of epilepsy. These compounds have moreover, the particular advantage that their therapeutic ratio (quotient of effective and toxic dose) is particularly high; in this regard the new compounds are generally superior to compounds presently used in this field.

The new compounds of the general formula can be prepared as follows:

(a) A cyclopentyl-or cyclohexylmethylamine of the general Formula II

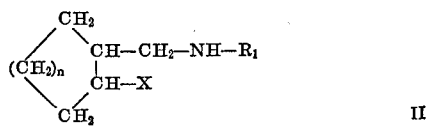

wherein $R_1$, X and $n$ have the above meanings, is acylated with an acylating agent suitable for the introduction of the acyl group —CO—$R_2$, and/or (b) For the preparation of compounds of the general Formula I, in which the X-substituent is a halogen atom or an —OR group, a compound of the general formula I, in which X represents a hydroxyl group, is reacted to exchange this group for a halogen atom, or is etherified with a group $R_1$.

The N-acylation of the compounds of the general Formula II can be effected according to any desired methods suitable for this purpose, preferably by treatment with an acid chloride corresponding to the acyl group to be introduced. Where X represents a hydroxyl group this may be exchanged for example, by conventional methods, for the desired halogen atom, either directly, e.g. using thionyl chlorides, or indirectly, e.g. through the p-toluenesulphonyl intermediate.

The compounds of the general Formula I in which X is other than hydrogen, can exist according to the relative position of the substituents bonded to the carbon atoms 1 and 2 of the alicyclic nucleus—in cis or trans-diastereoisomeric forms. The invention also includes, in the case of these compounds, both the pure cis- and trans-forms, as well as the diastereoisomeric mixtures containing both forms and the preparation of these compounds starting from the starting materials of corresponding configuration.

The cyclopentyl or cyclohexylmethylamines of the general Formula II, used as starting materials for the process according to the invention, are either already known compounds, or can be prepared according to generally known methods. Compounds of the general Formula II, in which $R_1$ is other than a hydrogen atom, can be prepared, for example, from the corresponding cycloalkylmethylamines containing a free amino group ($R_1$=H) by conventional N-alkylating or N-arylating methods. Such N-monosubstituted compounds of the general Formula II can, however, also be prepared directly from the corresponding alicyclic carboxylic acids, e.g. from cis- or trans-hexahydrosalicylic acid by reaction with amines of the general Formula $R_1$—$NH_2$ to form the corresponding amides of the general Formula III

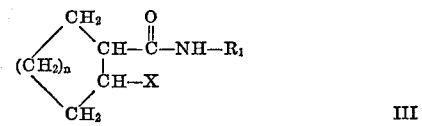

wherein $R_1$, X and $n$ have the above meanings and reducing the carbonyl group, e.g. with lithium aluminium hydride. Compounds of the general Formula II, which contain a free amino group ($R_1$=H), can also be obtained e.g. from the corresponding carboxylic acid nitriles by catalytic hydrogenation or other conventional reducing methods.

The compounds of the general Formula I, according to the invention, can be formulated in conventional manner into orally, enterally or parenterally administrable pharmaceutical preparations, using conventional solid or liquid carriers and/or other pharmaceutical excipients, such as e.g. binding agents, lubricants, coating materials etc.

For the better understanding of this invention the following examples are given by way of illustration only.

EXAMPLE 1

(a) Cis-2-aminomethyl-cyclohexanol 25.0 g. (0.105 mol) of cis-2-hydroxycyclohexane-carboxylic acid amide suspended in 1.2 litres of absolute ether are introduced into a 2 litre three-necked round bottomed flask provided with a stirrer and reflux condenser and 9.0 g. (0.237 mol) of lithium aluminium hydride are added in small portions over a period of approximately one hour. The reaction mixture gently boiled and stirred for 20 hours and then allowed to stand for 24 hours at room temperature. Then, 15 ml. of water followed by 15 ml. of 15% caustic soda solution and finally 30 ml. water is added dropwise to the reaction mixture whilst cooling. The resulting precipitate is filtered off after 15 minutes' stirring and washed with ether. The filtrate is dried over anhydrous potassium hydroxide and evaporated; 11.8 g.

of cis-2-aminomethylcyclohexanol (87.2% of theory) is obtained in the form of a greenish oily residue which subsequently solidifies. This product can be used without further purification for the next reaction step. The hydrochloride prepared in conventional manner from a mixture of alcohol and ether crystallises in the form of well-developed white crystal platelets, M.P. 182.5–183° C.

(b) N-(p-tert-butyl-benzoyl)-cis-2-aminomethyl-cyclohexanol 8.0 g. (0.062 mol) of cis-2-aminomethylcyclohexanol are taken up in 20 ml. of benzene and introduced into a one litre three-necked round bottomed flask containing 4.8 g. (0.12 mol) of a caustic soda solution dissolved in 150 ml. of water. Accompanied by stirring, a solution of 16.0 g. (0.813 mol) of freshly distilled p-tert-butylbenzoic acid chloride in 20 ml. of benzene is added in small portions to the reaction mixture within about 20 minutes at +5° C. On termination of the addition the reaction mixture is stirred for a further 20 minutes and then 150 ml. of petroleum ether (boiling point 40–60° C.) added. The precipitate which separates is filtered off, washed with water and then with petroleum either, dried and recrystallised from a mixture of benzene and petroleum ether. 14.7 g. of white crystalline N-(p-tert-butylbenzoyl)-cis - 2 - aminomethylcyclohexanol (82.04% of theory) are obtained; M.P. 122–122.5° C.

In similar manner using the corresponding acid chloride the following compounds are prepared in yields varying between 70 and 92%.

N-(m-methoxybenzoyl)-cis-2-aminomethylcyclohexanol, M.P. 96–96.5° C.;
N-(3,4,5-trimethoxybenzoyl)-cis-2-aminomethylcyclohexanol, M.P. 159–159.5° C.;
N-(o-bromobenzoyl)-cis-2-aminomethylcyclohexanol, M.P. 111–111.5° C.
N-(p-methylbenzoyl)-cis-2-aminomethylcyclohexanol, M.P. 131.5–132.4° C.

EXAMPLE 2

N-(p-methylbenzoyl)-trans-2-aminomethylcyclohexanol 20.5 g. of trans-hexahydrosalicylic acid is esterified in conventional manner with diazomethane, the ether used as the reaction medium is distilled off and the trans-hexahydrosalicylic acid methylester obtained as residue is introduced into 1 litre of methanol saturated with ammonia. After addition of a catalytic quantity of sodium metal the reaction mixture is left to stand at room temperature for two weeks. The reaction mixture is then evaporated to dryness and the residue is repeatedly recrystallised from benzene. In this way 12.3 g. of trans-hexahydrosalicylic acid amide (60.5% of theory) are obtained; M.P. 104–105° C.

In the manner described in Example 1, trans-2-aminomethylcyclohexanol with 76% yield can be prepared from this amide and from this aminoalcohol and p-methylbenzoic acid chloride, N - (p-methylbenzoyl)-trans-2-aminomethylcyclohexanol may be obtained melting at 100–100.5° C. in an 81% yield.

EXAMPLE 3

N-(3,4,5-trimethoxybenzoyl)-cis-2-aminomethyl-cyclopentanol

From cis-2-carbethoxy cyclopentanol cis-2-hydroxy-cyclopentane carboxylic acid amide is prepared according to Example 1 and from this cis-2-aminomethyl cyclopentanol is prepared according to Example 1.

According to Example 1(b) from this amino-alcohol together with 3,4,5-trimethoxy benzoyl chloride N-(3,4,5-trimethoxybenzoyl)-cis-2 - aminomethylcyclopentanol is obtained; the recrystallised, colourless crystals from benzene melt at 137–138° C.

With similar yields using the corresponding acid chlorides the following compounds are prepared in analogous manner.

N-(o-bromobenzoyl)-cis-2-aminomethylcyclopentanol, crystallises from ether in colourless needles, M.P. 106–106.5° C.;
N-(p-chlorobenzoyl)-cis-2-aminomethylcyclopentanol, from ethanol, colourless crystals, M.P. 124.5–125° C.;
N-(p-nitrobenzoyl)-cis-2-aminomethylcyclopentanol, from ethanol, pale yellow prisms, M.P. 172.5–173° C.;
N-(3,5-dinitrobenzoyl)-cis-2-aminomethylcyclopentanol, from ethanol, almost colourless, pale yellow crystals, M.P. 212° C.

EXAMPLE 4

N-benzyl-N-(3,4-dinitrobenzoyl)-trans-2-aminomethyl-cyclohexanol

By the reaction of trans-hexahydrosalicylic acid with benzylamine in conventional manner at 180° C., N-benzyl-trans - 1 - hydroxycyclohexane - 2 - carboxylic acid amide is prepared. The crude reaction product obtained after distilling off the excess benzylamine is recrystallised from ethanol. 19.5 g. (0.09 mol) of the amide thus obtained are reduced according to Example 1(a) with lithium aluminium hydride and the resulting reaction product is converted into the hydrochloride by adding aqueous hydrochloric acid. The aqueous hydrochloride solution obtained is extracted three times with equal volumes of ether, the aqueous solution thus freed from by-products is made alkaline with sodium carbonate and again extracted three times with equal volumes of ether. These latter ether extracts are combined, dried over anhydrous potassium hydroxide and evaporated to dryness. 15.6 g. of N-benzyl-trans-2-aminomethylcyclohexanol (85% of theory) are obtained as residue which is sufficiently pure for further reaction. From this product and 3,5-dinitrobenzoyl chloride N-benzyl-N-(3,5-dinitrobenzoyl)-trans-2-aminomethylcyclohexanol is obtained according to Example 1(b) in 73.5% yield and melting at 162–162.5° C.

EXAMPLE 5

Preparation of N - acyl - cis- and trans - 2 - aminomethyl-cyclohexanol derivatives: determination of the isomeric ratio 2-cyanocyclohexanol (prepared from cyclohexane-chlorohydrin in 50% ethanol with excess KCN) is hydrogenated in ethanol saturated with amonia in the presence of Raney nickel at 20 atmospheres initial pressure and the amino alcohol obtained on working up in the usual manner is converted into the hydrochloride. The resulting 2-amino methylcyclohexanol hydrochloride, after recrystallisation from a mixture of ethanol and ether, melts at 147–149° C. The contents of cis- and trans- compounds was determined by infra-red spectroscopy. The cis-2-aminomethylcyclohexanol hydrochloride shows characteristic absorption at 895 cm.$^{-1}$ and the trans-2-aminomethylcyclohexanol hydrochloride at 1200 cm.$^{-1}$; the characteristic band for the one isomer not occurring in the spectrum of the other isomer. By this method the ratio of the cis- to trans-isomers in the above amino alcohol was approximately 1:4.

From the above isomeric amino alcohol hydrochloride mixture, N - (p - nitrobenzoyl) - 2 - aminomethylcyclohexanol was prepared as described in Example 1(b) (cis-trans-isomer mixture, M.P. 140–143° C. after a single recrystallisation from ethanol). The ratio of the isomer(s) in this product was also determined according to the above-mentioned infra-red spectroscopic method. The above-found ratio of about 1:4 was also confirmed for the acylated product on the basis of the characteristic absorptions at 985 cm.$^{-1}$ and 1045 cm.$^{-1}$ with the spectra of authentic samples of cis- and trans-N-(p-nitrobenzoyl)-2-aminomethylcyclohexanol prepared according to Example 1. From the above cis-trans-amino-alcohol present isomer mixture the following N-acylated products were prepared in the manner described in Example 1(b).

N-(p-chlorobenzoyl)-2-aminomethylcyclohexanol, colourless crystals from ethanol, M.P. 153–154° C.;
N-(o-chlorobenzoyl)-2-aminomethylcyclohexanol, twice recrystallised from ethanol, well developed translucent crystals, M.P. 113–114° C.;
N-benzoyl-2-aminomethylcyclohexanol once recrystallised from ethanol, M.P. 114–117° C.

After three recrystallisations from ethanol, a stereo-uniform product was obtained melting at 128.5–129.5° C. in 29% yields (calculated on the basis of the cis-trans-aminoalcohol used as the starting material).

EXAMPLE 6

A solution of 7.9 g. (0.03 mol) 3,5-dinitrobenzoyl-chloride in 60 ml. of benzene is added dropwise with stirring at 10° C. over a period of 20 minutes to a mixture of 4.6 g. (0.025 mol) of 2-aminomethylcyclohexylchloride, 40 ml. of benzene and a solution of 4.4 g. sodium hydroxide in 80 ml. of water. The mixture was stirred for a further 20 minutes with cooling, then the separation of crystals was completed by the addition of 100 ml. of petroleum ether. The separated product was washed with water and then with petroleum ether and then dried. After recrystallisation from ethanol 7.2 g. of N - (3,5 - dinitrobenzoyl) - 2 - aminomethylcyclohexylchloride (85% of theory) were obtained in the form of pale yellow, almost colourless crystals, M.P. 162–162.5° C.

The following compounds were prepared in an analogous manner:

N - (3,4,5 - trimethoxybenzoyl) - 2 - aminomethylcyclohexylchloride, colourless crystals from ethanol, M.P. 163–164° C.;
N-(p-methoxybenzoyl) - 2 - aminomethylcyclohexylchloride, colourless crystals, from ethanol, M.P. 147.5–148° C.

We claim:
1. N - (p - tert. - butyl - benzoyl) - cis - 2 - aminomethylcyclohexanol.
2. N - (3,4,5 - trimethoxybenzoyl) - cis - 2 - aminomethylcyclohexanol.
3. N - benzyl - N - (3,5 - dinitrobenzoyl) - trans - 2 - aminomethylcyclohexanol.

References Cited

UNITED STATES PATENTS 3,467,705  9/1969  Gigante et al. _____ 260—561

OTHER REFERENCES

Baumgarten et al., J. Am. Chem. Soc., vol. 80, pp. 4588–93 (1958).
Braun et al., Berichte, vol. 66, pp. 1373–78 (1933).
Striegler et al., J. Praktische Chemie, 4 Reiche, Band 29, pp. 281–95 (1965).
Colonge et al., Comptes Rend, pp. 1080–81 (1960).

HENRY R. JILES, Primary Examiner

H. I. MOATZ, Assistant Examiner

U.S. Cl. X.R.

260—557 R, 563 C; 424—320